(12) United States Patent
Gee et al.

(10) Patent No.: US 8,744,397 B2
(45) Date of Patent: Jun. 3, 2014

(54) SYSTEM FOR PROVIDING PROFILE INFORMATION

(75) Inventors: Robert Gee, Lake Barrington, IL (US); Shafer Seymour, Bartlett, IL (US)

(73) Assignee: Continental Automotive Systems, Inc., Auburn Hill, MI (US)

( * ) Notice: Subject to any disclaimer, the term of this patent is extended or adjusted under 35 U.S.C. 154(b) by 258 days.

(21) Appl. No.: 13/038,639

(22) Filed: Mar. 2, 2011

(65) Prior Publication Data

US 2012/0225634 A1  Sep. 6, 2012

(51) Int. Cl.
*H04M 11/02* (2006.01)

(52) U.S. Cl.
USPC .............. 455/404.1; 455/569.2; 455/575.9; 701/45

(58) Field of Classification Search
USPC .................... 455/456.1, 404.1; 701/45
See application file for complete search history.

(56) References Cited

U.S. PATENT DOCUMENTS

| | | | | |
|---|---|---|---|---|
| 6,116,639 | A * | 9/2000 | Breed et al. ................ | 280/735 |
| 6,340,928 | B1 * | 1/2002 | McCurdy .................... | 340/436 |
| 7,738,881 | B2 * | 6/2010 | Krumm et al. ............. | 455/456.1 |
| 7,937,066 | B2 * | 5/2011 | Kaltsukis ................... | 455/404.1 |
| 8,112,061 | B2 * | 2/2012 | Bolin ......................... | 455/404.2 |
| 8,190,730 | B2 * | 5/2012 | Dempsey .................... | 709/224 |
| 2003/0139179 | A1 * | 7/2003 | Fuchs et al. ................ | 455/426 |
| 2005/0062595 | A1 * | 3/2005 | Hofbeck et al. ............ | 340/457.1 |
| 2005/0130723 | A1 * | 6/2005 | Grivas et al. ............... | 455/575.9 |
| 2005/0215282 | A1 * | 9/2005 | Oesterling et al. ......... | 455/556.1 |
| 2008/0228358 | A1 * | 9/2008 | Wang et al. ................ | 701/49 |
| 2009/0058057 | A1 * | 3/2009 | Ghabra et al. .............. | 280/733 |
| 2009/0121854 | A1 * | 5/2009 | Raisanen et al. ........... | 340/438 |
| 2009/0148827 | A1 * | 6/2009 | Argott ........................ | 434/433 |
| 2009/0192898 | A1 * | 7/2009 | Baril .......................... | 705/14 |
| 2009/0319341 | A1 * | 12/2009 | Berkobin et al. ........... | 705/10 |
| 2010/0152947 | A1 * | 6/2010 | Denholm et al. ........... | 701/29 |
| 2012/0053793 | A1 * | 3/2012 | Sala et al. ................... | 701/45 |

FOREIGN PATENT DOCUMENTS

| | | |
|---|---|---|
| DE | 102008028844 A1 | 1/2009 |
| WO | 2009/014703 A1 | 1/2009 |

OTHER PUBLICATIONS

European Telecommunications Standards Institute (ETSI), "Human Factors(HF); Intelligent Transport Systems (ITS); ICT in cars" Technical Report, Apr. 1, 2010, vol. HF, No. V1.1.1, ETSI, Sophia-Antipolis, France.
Yilin Zhao, "Telematics: Safe and Fun Driving", IEEE Intelligent Systems, Jan. 1, 2002, pp. 10-14, vol. 17, No. 1, ISSN: 1094-7167, DOI: 10.1109/5254.988442, IEEE Service Center, New York, NY, US.
International Search Report and Written Opinion dated May 7, 2012, from corresponding International Patent Application No. PCT/US2012/023167.

* cited by examiner

*Primary Examiner* — Charles Shedrick

(57) ABSTRACT

A system and method for providing profile information for occupants of a vehicle to a service provider. The system may communicate with at least one mobile device to receive an identification from each mobile device. The system may store profile information of an occupant associated with each identification. The system may communicate with the service provider to transmit the profile information associated with the mobile devices if a crash condition is identified and communication with the mobile device occurred during a time period just prior to the crash condition.

23 Claims, 4 Drawing Sheets

SYSTEM FOR PROVIDING PROFILE INFORMATION

BACKGROUND

1. Field of the Invention

The present invention generally relates to a system for providing profile information to a service provider.

2. Description of Related Art

Telematics systems have more recently provided an increasing part in the notification of emergency situations to emergency response teams. Typically, the telematics system can contact the occupants through the onboard voice capability, notify the emergency responders that an accident occurred, and provide the location of the accident. If the on-board voice system is still operational the operator may stay on the call to talk with the occupant. Otherwise, the emergency responders must arrive at the scene of the accident and access the situation. However, additional assistance from the telematics system is not available.

SUMMARY

A system and method is provided for communicating profile information for occupants of a vehicle to a service provider. The system may communicate with one or more mobile devices to receive an identification from each mobile device. The system may store profile information of an occupant associated with each identification. The system may communicate with the service provider to transmit the profile information associated with the mobile devices if a crash condition is identified and communication with the mobile device occurred during a time period just prior to the crash condition.

Since many cars in the future will have Bluetooth or similar capabilities, information to identify the occupants may be obtained via a Bluetooth-connected phone. Emergency calls may send typical advanced automatic crash notification (AACN) crash data when the vehicle is in an accident, as well as, profile information for each mobile phone in the vehicle. Profile information such as gender, age, and medical information may be associated with each mobile phone.

The profile information can help the telematics service provider (TSP) identify vehicle occupants and provide additional contact numbers for the TSP to call in the event of a crash. The TSP may be able to associate some of these numbers with known persons. For example, the TSP may be able to identify the owner's wife, owner's daughter, or even another subscriber not associated with this vehicle, which could provide an additional calling tree for the TSP. The user could press the E-call button, and if the primary mobile phone is busy, then the TSP could call another mobile number in the car even if the vehicle audio system is not operable.

In addition, when a crash scenario is detected, the TSP can now estimate the total number of people in the car, and even associate the phone identifiers with any registered users. Accordingly, the TSP can make inferences such as: "There was a crash, and at least 3 people are in the car according to their cell phone presence. Female 48 years of age, one unknown person, and a female 12 years of age. The female 12 years of age lists an allergy to aspirin. Only one cell phone (#555-1212) still seems to be connected to the network, but no one is answering, the others are disabled now." This message could then be forwarded to an emergency response server and/or to an emergency response unit in transit or at the scene of the accident.

The TSP could now also have a prioritized calling list. For example, if cell phone #1 is involved in an apparent crash and cannot be reached, the user can specify cell phone #2 (e.g. his wife) to be notified. In addition, the TSP now can make a decision to move further down the contact list, if both phone #1 and cell phone #2 were in the crash. As such, the telematics server could employ logic that determines cell phone #1 and cell phone #2 are now in the "crash" category, therefore, the next "notification" category number may called by the TSP.

In one example, a mobile phone may be connected to the vehicle (Bluetooth, USB, etc.) via the head unit. The telematics controller may store the caller ID information (phone number or other identifier) in the telematics system or immediately send the ID information to the TSP. For example, the MSISDN of the phone may be captured and stored or sent to the TSP. When a crash occurs, as part of a data-only stream, the system could send the ID information along with the crash notification. This enhances safety services, since the TSP knows which number to call first, and what may be implied if that number is no longer available. The connection status at the time of the message of one or more of the mobile phones may also be included. The status may include, for example, if a Bluetooth phone was connected before the crash, but is not available after the crash.

Further objects, features and advantages of this invention will become readily apparent to persons skilled in the art after a review of the following description, with reference to the drawings and claims that are appended to and form a part of this specification.

DETAILED DESCRIPTION

Figure 1:
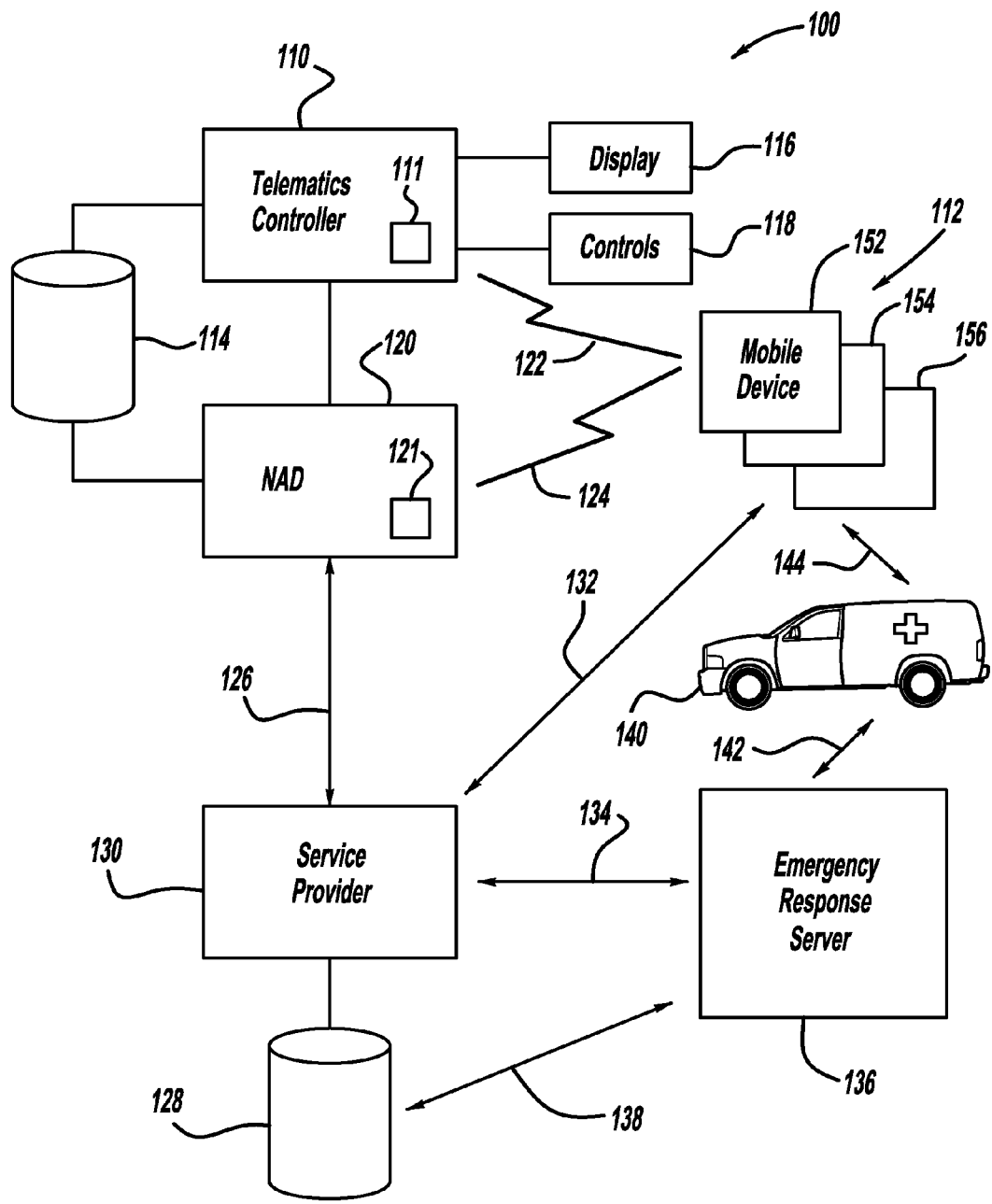
FIG. 1 is a schematic view of a system for providing profile information to a service provider.

Now referring to FIG. 1, a system 100 is provided for providing profile information to a service provider. The system 100 includes a telematics controller 110 and a network access device 120. The telematics controller 110 is connected to a display 116 and controls 118. The telematics controller 110 may include a transceiver 111 configured to communicate with one or more cellular phones 112 within the vehicle as denoted by line 122. More recently, mobile devices such as cellular phones have been proliferated to the point where each person in the vehicle may be carrying a cellular phone. For example, the driver may be carrying a cellular phone 152, the front passenger may be carrying a cellular phone 154 and a rear passenger may be carrying a cellular phone 156. Typically each cellular phone tends to remain on the person associated with that particular cellular phone. Each cellular phone may include identification information that may be indicated to the telematics controller 110 over the communication link 122. The information may include an identification number but may also include additional information such as the user's name, the user's address, or other information. Further, the identification information may be stored in a database 114 connected to the telematics controller 110.

The display 116 and controls 118 may allow a user to provide additional profile information that may be associated with each cellular phone and stored in the database 114 with the identification for each cellular phone. Further, the telematics controller 110 may identify when a new (unknown) cellular phone is identified. When the new cellular phone is first connected with the telematics controller 110, the user may be prompted through the display 116 to enter profile information for the user. Profile information may include information such as the user's name, the user's age, the user's gender, user health information, or other user information. As such, each set of profile information may be readily accessed based on the identification information or other keys such as the phone number or user name. In addition, the telematics controller 110 may be configured to periodically identify mobile devices such as cellular phones within communication range of the transceiver 111. Further, the telematics controller 110 may store the list of mobile devices 112 within communication with the transceiver 111.

In the same or other implementations, the network access device 120 may include a transceiver 121 that communicates with a mobile device 112 as denoted by line 124. The network access device 120 may operate the transceiver 121 in a similar fashion to the transceiver 111. Some implementations may use a separate transmitter and receiver instead of transceiver 111. In such implementations, the network access device 120 will communicate with the telematics controller 110 to notify the telematics controller when a new mobile device has been identified allowing the telematics controller 110 to prompt the user for the profile information as previously discussed.

In one implementation the communication links 122 and/or 124 may be a Bluetooth communication link. When connected via Bluetooth, a mobile device may support the standard Bluetooth Hands Free Profile (HFP), then the vehicle could use the command "AT+CNUM", which is part of the HFP specification, to learn the phone number of the mobile device. This technique may be used to support the scenario in which the vehicle has Bluetooth and the mobile phone is paired with the vehicle. The vehicle also then knows the Bluetooth Device Address associated with the mobile phone, and the Bluetooth Name of the mobile phone. This information can be stored by the vehicle, so that the next time the phone is nearby, the vehicle can detect it and remember the phone number, even without fully establishing a connection.

For the multiple phone scenarios, where the phones are detectable via Bluetooth, the vehicle would need to be paired with the other phones at some point in advance. This way, the vehicle can store the various Bluetooth Device Addresses and associated Bluetooth Names, as well as, the corresponding phone numbers. The vehicle could then use the identifiers to either send the full list of local Bluetooth phones to the TSP, or just a single Bluetooth phone based on priority list. Since the vehicle was previously paired to these mobile devices, it can detect the local Bluetooth Names without fully connecting to those devices.

If the vehicle does not have a connection to the phone, such as over Bluetooth, then the consumer could manually enter the mobile phone number or calling tree. This could be done in the vehicle through the user interface, or on the TSP servers via web page or other access. Although the vehicle could not detect which phone(s) are present in the vehicle, this would still allow for voice-based telematics services, for example, when using the data-only embedded telematics module in the vehicle.

The following optional approaches can be implemented as well. Potential types and categories of numbers may be configured. A primary voice number may be defined for TSP to call when a telematics service is triggered. If more than one number is provided, the user could define a prioritized list. Prioritization may also be possible by specific day, time, location, or other criteria (e.g., if Monday-Friday, Phone 1 is prioritized; else Phone 2).

The user may also define prioritized phone numbers for other categories such as notification number(s) to call in case of breakdowns, emergencies, etc., as well as, service provider numbers (e.g. vehicle service centers, preferred hospitals, etc.).

Manual entry of mobile phone number(s) may also occur outside of the vehicle. This could be done remotely by the consumer (such as via web page), and sent/stored on either TSP servers or stored by the vehicle. In all cases, there may be multiple numbers entered into the categories above.

Manual entry of mobile phone number(s) may also occur in the vehicle through a user interface. This could be done once with the vehicle storing the numbers for later use. Further, phone numbers could also be stored on a temporary basis such as use with a rental car, or for a single trip.

The system may automatically detect the primary phone in the vehicle. The primary phone detection may be based on Bluetooth Pairing that was previously done between the vehicle and mobile phone. When vehicle is started, based on priority order, if more than one phone had been paired previously, and which phones are detected, the vehicle can identify the primary voice number. This number can either be sent to the TSP when a telematics service is requested, or sent some time in advance and stored by the TSP.

The system may automatically detect multiple phones in the vehicle. The system may detect each phone in the vehicle base on Bluetooth Pairing that was previously done between the vehicle and mobile phones. When vehicle is started, based on priority order, whether more than one phone had been paired previously, and which phones are detected, the vehicle can identify the primary voice number. Other previously paired phones can be detected, and used to adjust the call lists. For example, if the emergency notification phone is also in the car, the system could select a different phone which is not in the car. The number of this phone can either be sent to the TSP when a telematics service is requested, or sent some time in advance and stored by the TSP.

The presence of Bluetooth mobile phones may be detected once or multiple times during a drive. If done only once, it could be when the car starts, or when the vehicle begins moving, or when a telematics service is triggered. If done multiple times, the car could check to see if there is any change to the available devices and adjust the strategy if changes are detected. This is useful if two phones are detected when the car is started, but one person was standing outside the car. So when the car drives away, only one phone can be detected.

The system may also manage phone lists and categories. The preferences and data could be stored and managed on the vehicle. For example, when a telematics service is triggered, the vehicle would send the relevant phone data to the TSP. The preferences and data could also be stored and managed on a server, such as a server controlled by the TSP. For example, the telematics controller could send info about detected phones to the TSP, which then modifies the calling tree accordingly. The telematics controller then does not need to send this information to the TSP when a telematics service is triggered. If there is a collision, and if the detected phones change, then the telematics controller could send the updated information to the TSP.

As such, the telematics controller 110 or the network access device 120 may periodically determine which mobile devices 112 are located within the vehicle and store such information periodically for use in an emergency situation. The network access device 120 may be in communication with a service provider 130 as denoted by line 126. The network communication 126 between the network access device 120 and the service provider 130 is discussed in detail with regard to FIG. 3 and FIG. 4. If the telematics controller 110 detects that a crash condition exits, the telematics controller 110 may communicate with the network access device 120 to initiate an emergency communication to the service provider 130. In such a situation, the telematics controller 110 and/or the network access device 120 may communicate with the mobile devices 112 to determine which mobile devices are still active within a vehicle. The list of which mobile devices are still active may be provided to the service provider 130 along with corresponding profile information for each mobile device that is identified. Further, a list of mobile devices that were active in the time period just previous to the crash condition may also be sent along with the profile information for each of those devices. The difference of whether a device was previously active and is now inactive may indicate the severity of the collision to that occupant or that the occupant is now located outside of the vehicle. The service provider 130 may store the mobile device information along with the corresponding profile information in a database 128. The service provider 130 may transmit the information to an emergency response server 136 along with the mobile device information and the user profile information as denoted by line 134. Further, the emergency response server 136 may have access to the database 128 as denoted by line 138. The emergency response server 136 may transmit the data to an emergency response unit 140 as denoted by line 142. A screen or print out of an emergency response unit 140 may indicate normal device and user profile information including any medical history to the emergency response unit to facilitate rescue and treatment of the occupants of the vehicle in an emergency situation. Further, the service provider 130 may contact one or more of the mobile devices 112 to provide assistance to the vehicle occupants. The user may prioritize the order of the mobile devices 112 to contact by the service provider 130. Further, the user may provide a list of additional telephone numbers or contact information along with a priority order for the service provider to notify about the crash situation of the vehicle.

Figure 2:
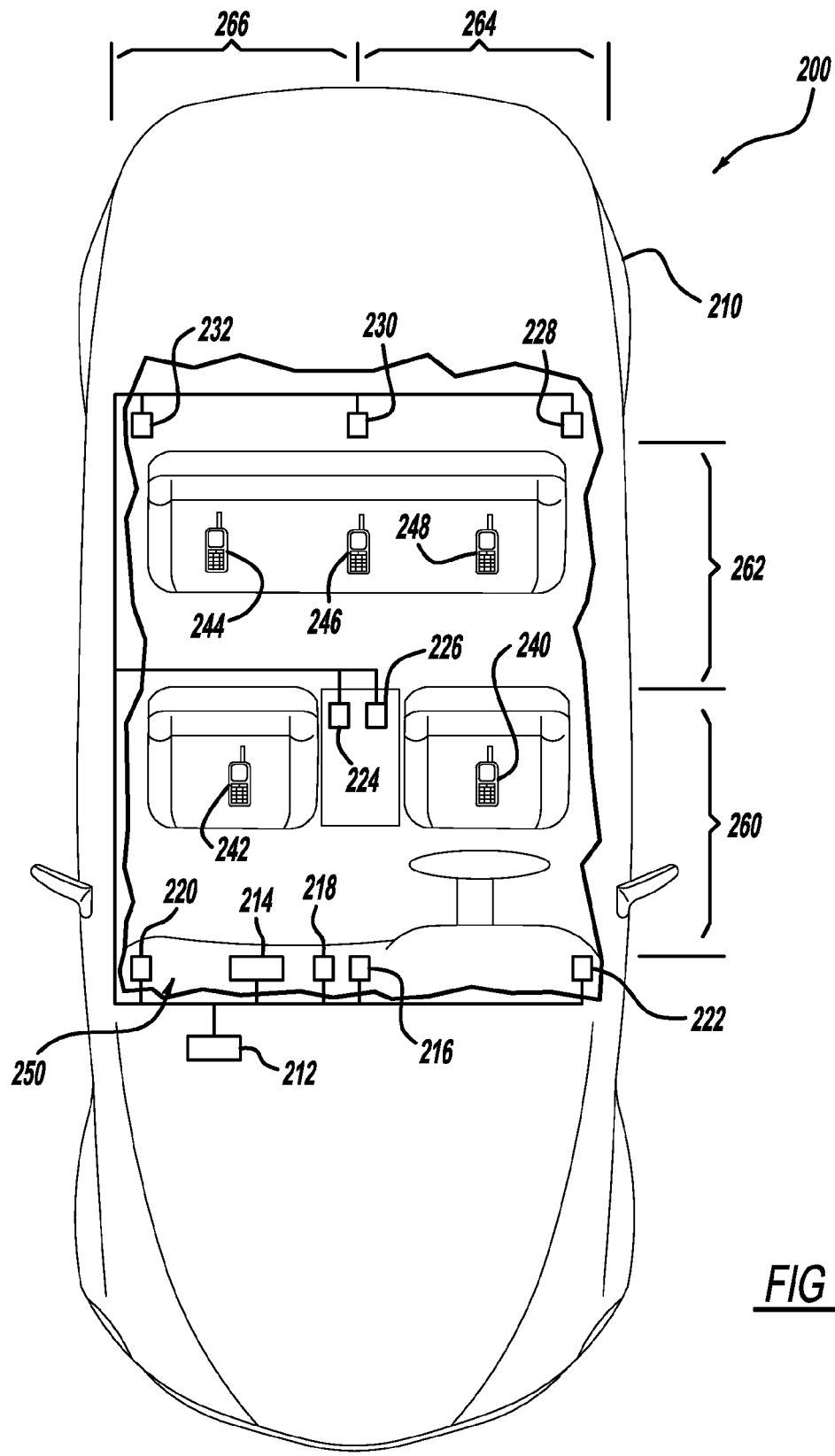
FIG. 2 is a schematic view of a system for providing profile information to a service provider implemented in a vehicle.

Now referring to FIG. 2, one implementation of the system in FIG. 1 is provided within a vehicle 210. The telematics controller 212 is in communication with a plurality of transceivers 218-230 located about the vehicle. For example, transceivers 220, 218, 222, may be located on the front console 250 the vehicle 210. A cellular phone located with the driver is denoted by reference number 240. The driver may keep the cellular phone 240 on his person or alternatively may place the cellular phone in a cradle 216, for example, shown on the dashboard to charge the cellular phone or allow communication of the cellular phone with a vehicle telematics system 212. The closer the cellular phone 240 is to a particular transceiver, the stronger the communication from the cellular phone 240 will be. As such, the strongest signals for cellular phone 240 will come from transceiver 226, 218, and 222. Based on the location of these transceivers within the vehicle, the telematics controller 212 can determine that the cellular phone 240 is located in the front seat area 260 and also in the left side 264 of the vehicle 210. Similarly, the cellular phone 242, which may be located with the front passenger, may provide the strongest signals to transceiver 220, 218, and 224. As such, the telematics controller 212 may determine that the cellular phone 242 and, therefore, the associated passenger is located in the front seat area 260 and the right hand side 266 of the vehicle 210.

Transceivers 224 and 226 may be located on a middle console between the two front seats. Further, transceivers 232, 230, 228 may be located on the rear seat or the rear window console. As such, cellular phone 244 may provide the strongest signals to transceiver 224 and 232 allowing the telematics controller 212 to determine that cellular phone 244 is located in the rear seat area 262 of the vehicle and on the right hand side of the vehicle 266. Cellular phone 248 may provide the strongest signal to transceivers 230, 228, and 226 thereby allowing the telematics controller 212 to determine that cellular phone 248 is located on the left hand side of the vehicle 246 and in the rear seat area 262. Similarly, cellular phone 246 will be located in the middle of the rear vehicle seat area 262 and may provide the strongest signal to transceiver 230 and equal signals to transceivers 232, 228, as well as, transceivers 224 and 226. Since occupants may tend to sit in the same seat of a vehicle, statistical information over time as to which seat should be associated to a particular mobile device may be stored in the profile information. Further, the position of the device may be stored along with the status of the device by the telematics controller and/or the network access device periodically. Accordingly, when a crash condition occurs, the network access device may transmit to the service provider the position of the cellular phone in the time period just prior to the crash condition occurring.

Figure 3:
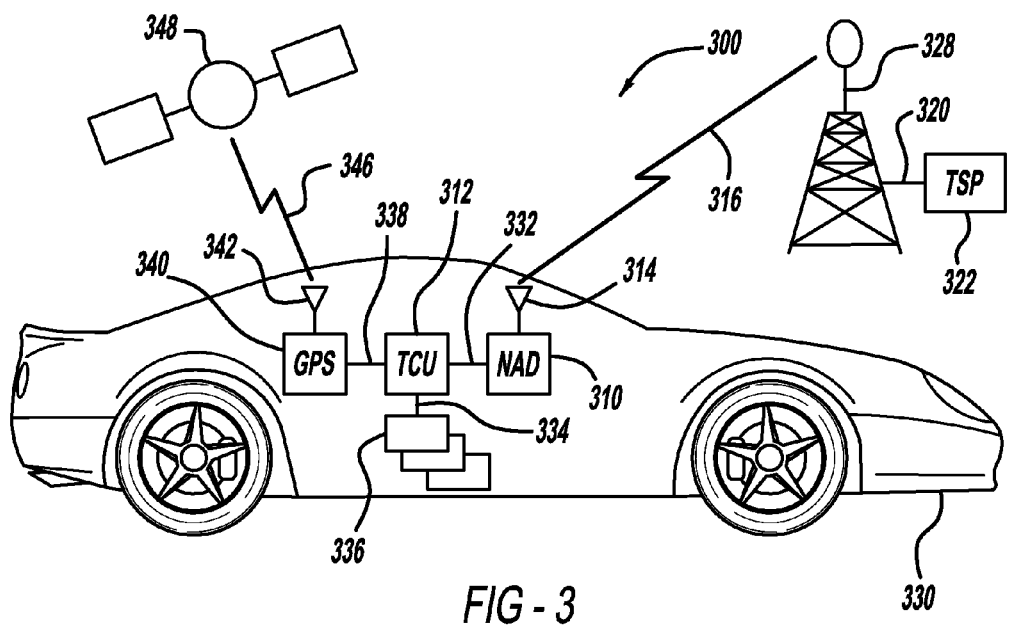
FIG. 3 is a schematic view of a system with a telematics controller and network access device implemented within a motor vehicle.

Now referring to FIG. 3, one possible implementation of the system 300 is provided within a vehicle 330. The network access device 310 may be provided in the same or a separate package from the telematics controller 312. The network access device 310 may be connected to an antenna 314. The antenna 314 may be representative of a plurality of antennas or a matrix of antennas depending upon the particular communication mode selected. Communication of the network access device 310 is facilitated with a remote station 328 as denoted by line 316. As described previously, the remote station 328 may be in communication with a service provider 322 including a network server through a network 320. The telematics controller 312 may be in communication with a global positioning device 340 over the vehicle bus or a custom connection as denoted by line 338. The global positioning device 340, such as a satellite global positioning system (GPS), may be in communication with an antenna 342. The antenna 342 may be one of a plurality of antennas or a matrix of antennas. Further, the antenna or plurality of antennas represented by reference number 342 may be the same antennas as denoted by reference number 314. The GPS unit may be in communication with a set of GPS satellites 348, as denoted by line 346. As such, the GPS unit 340 may retrieve positional data for the vehicle or in other implementations 340 may also represent a general satellite receiver and, therefore, may receive other general broadcast information or communication from the satellite 348. The telematics controller 312 may also be in communication with various other vehicle devices and systems through the vehicle bus, wire harnesses, or other wireless connections as denoted by line 334. The various other devices 336 may include but are not limited to the engine control system, the vehicle locks, the vehicle safety systems (e.g. seatbelt retractors, airbags, etc.), vehicle entertainment system, or a suspension control system.

Figure 4:
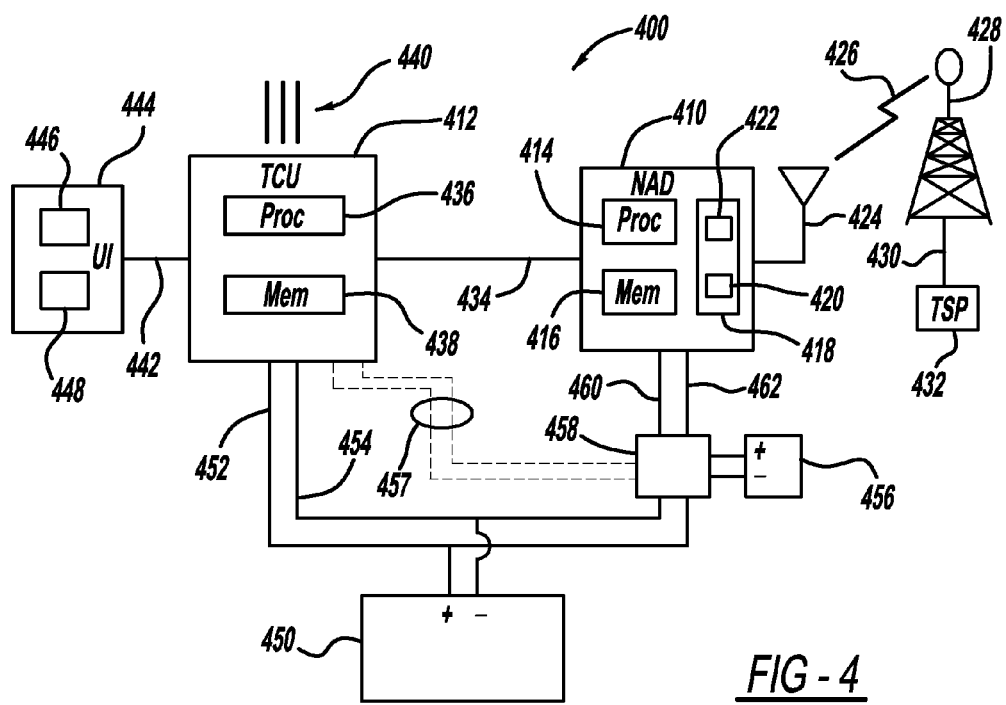
FIG. 4 is a schematic view of a system including a telematics controller and a network access device.

Now referring to FIG. 4, a system 400 is provided. The system includes a network access device 410 and a telematics controller 412. The network access device 410 may include a processor 414 and storage 416. The processor 414 may be a programmable microprocessor or alternatively may be an application specific integrated circuit (ASIC), or other known processor. The storage 416 may be a memory, for example, random access memory, static memory, or other data storage device. The network access device 410 may also include a transceiver 418 which includes a transmitter 422 and a receiver 420. Alternatively, the network access device 410 may include an independent transmitter and receiver. The transceiver 418 may be in communication with an antenna 424. The transceiver 418 may communicate with a radio tower 428 as denoted by line 426. The communication 426 between the network access device 410 and the radio tower 428 may comprise one of a plurality of communication modes.

The transceiver 418 in the network access device 410 may be used for transmitting uplink communications and receiving downlink communication to and from the network 430 and service center 432 over the wireless communication link 426. The wireless communication link 426 may use a wireless protocol such as a standard cellular network protocol such as Advanced Mobile Phone Service (AMPS), Global System for Mobile Communications (GSM), Time Division Multiple Access (TDMA), Code Division Multiple Access (CDMA), and the like. To transmit data in the cellular environment, different types of standard bearer services exist including, but not limited to, general packet radio service (GPRS), short message service (SMS), circuit switched data service (CSD), and high-speed circuit switched data service (HSCSD). Further, standard transmission control protocol/internet protocol (TCP/IP) may also be used as well as satellite communications. In a further example, the transceiver 418 may be enabled using other wireless technologies such as Bluetooth technology. Bluetooth technology allows for the replacement of a wired connection by enabling devices to communicate with each other through a universal short-range radio link.

The radio tower 428 may be in communication with a service provider 432 including for example, a network server through a network 430. Network 430 may be an analog network such as a plain old telephone service (POTS) or a digital network for example, Ethernet over transmission control protocol/internet protocol (TCP/IP) protocol. In other examples, the network 430 could be one of several standard cellular communication networks, a satellite-based network, a public switched telecommunication network (PSTN), the Internet, an integrated services digital network (ISDN), and/or other communication networks. The service provider may include a service center to provide telematics applications and services to the vehicle. For instance, the service center may contain operators, content servers and content databases. The content servers for telematics applications and services may include traffic servers, map servers, user profile servers, location information servers, and the like. The content databases for telematics applications and services may include location information, user profiles, traffic content, map content, point-of-interest content, usage history, and the like.

The network access device 410 may be in communication with the telematics controller 412 through a communication interface 434. In some implementations the network access device 410 may be in the same package as the telematics controller 412. However, other implementations the network access device 410 may be provided in a separate package from the package of the telematics controller 412 and, therefore, may be located in a different area of the vehicle. Various information may be communicated between the telematics controller 412 and the network access device 410.

The telematics controller 412 may include a processor 436 and storage 438. The processor 436 may be a microprocessor, an application specific integrated circuit, a programmable gate array, or other processor. Further, the storage 438 may be a memory device for example, random access memory, read only memory, static memory, or may even be a hard drive or optical drive, or other means of data storage. The telematics control 412 may be in communication with a plurality of other vehicle sensors and devices through a wire harness or over the vehicle bus as denoted by lines 440. In addition, the telematics controller 412 may be in communication with a user interface 444 as denoted by line 442. The user interface 444 may include a display 446 and controls 448 for providing user input such as vehicle parameters into the telematics controller 412. Also, the user interface 444 may include elements such as a keyboard or keypad, one or more control buttons, indicator lights, one or more speakers, a microphone, and any other user interface type elements for telematics applications and services. Optionally, the telematics controller 412 may also be connected to a positioning unit. The positioning unit could be a system that determines the geographic location of the vehicle such as a global positioning system (GPS), a dead-reckoning system, and the like.

Further, the telematics controller 412 may be in communication with other vehicle systems, such as the engine control system, the vehicle lock controls, the vehicle safety systems (e.g. seatbelt retractors, airbags, etc.), vehicle entertainment system, or a suspension control system to implement the described functions of the telematics controller 412 or network access device 410 based on parameters of such systems.

The telematics controller 412 may be powered by the vehicle battery 450 as denoted by lines 452 and 454. Alternatively, a voltage converter may be provided to convert from the vehicle battery voltage to a different voltage that may be appropriate for running the telematics controller 412. The voltage converter may be included in the package for the telematics controller 412 or alternatively may be in a separate package between the vehicle battery 450 and the telematics controller 412. The vehicle battery 450 may also provide power to the network access device 410.

A circuit 458 may be included between the vehicle battery 450 and the network access device 410. The circuit 458 may include a voltage converter to change the voltage provided to the network access device 410 in lines 460 and 462. In addition, the circuit 458 may be connected to a network access device battery 456. The network access device battery 456 may be charged while the vehicle is running and may for example, be switched to provide power to the network access device 410 when power from the vehicle power system (e.g., the battery or alternator) is not available. Further, the circuit 458 may control the monitoring and periodic powering of the network access device if the vehicle is turned off for a long period of time. Further, the circuit 458 may control the charging of the network access device battery 456 at appropriate times according to the environmental variables or the expected use cycle of the vehicle. In addition, it is possible for network access device battery 456 to be switched to provide power to the network access device 410 and also to the telematics controller 412, as denoted by lines 457. In one example, this secondary battery could be switched to provide power to the network access device 410 alone, or alternatively to both the network access device 410 and telematics controller 412 at the same time.

Figure 5:
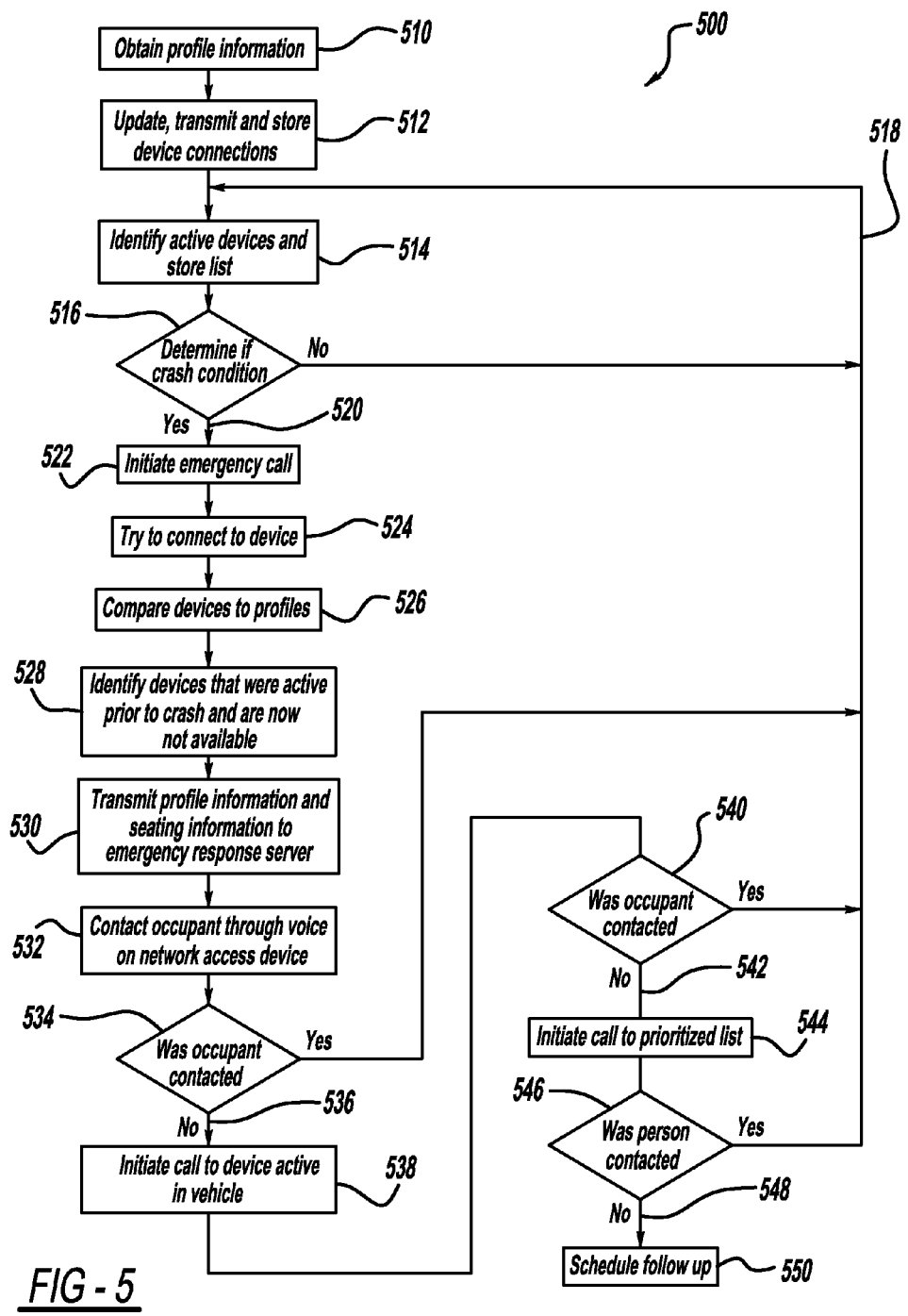
FIG. 5 is a flowchart illustrating a method for providing profile information to a service provider.

Now referring to FIG. 5, a method 500 is provided to communicate profile information with the service provider. In block 510, profile information is obtained for each cellular phone. In block 512, the user profile information may be stored along with the identification for the mobile device. Further, the identification and the profile information may be transmitted at that time to the service provider for storage and future use during a crash condition. In block 514, the system identifies the active mobile devices in the car based on their identification and stores a list of present devices for use in an emergency call scenario. In block 516, the system determines if a crash condition has occurred. If a crash condition has not occurred, the method follows line 518 back to block 514 where the method continues. If a crash condition has occurred, the method follows line 520 to block 522. In block 522, the system initiates an emergency call to a service provider. In block 524, the system attempts to connect to any mobile devices within the vehicle. In block 526, the system compares the available mobile devices to the profiles. In block 528, the system identifies mobile devices that were active prior to the crash that are no longer available and retrieves the profile information for those devices. In block 530, the system transmits the profile information and the seating information for each of the mobile devices that are presently available in the vehicle or were present during the period just prior to the crash condition occurring. The service provider may then transmit the information to an emergency response server which may then forward information to an emergency response unit. In block 532, the service provider contacts the vehicle through the voice on the network access device if available.

In block 534, if the occupant is contacted and, for example, no crash occurred, the method follows line 518 to block 514. If the occupant is not contacted, the method follows line 536 to block 538. In block 538, the service provider initiates a call to each active mobile device in the vehicle. The order that the active mobile devices in the car are contacted may be pre-set according to a priority list. In block 540, the system determines if the service provider has been able to contact a vehicle occupant. If the service provider has been able to contact a vehicle occupant, the method follows line 518 to block 514 where the method continues. If the service provider has not contacted an occupant from the vehicle, the method follows line 542 to block 544. In block 544, the service provider initiates a call to a prioritized list of contacts that are to be call in an emergency situation. In block 546, the system determines if a person has been contacted. If someone has been contacted, the method follows line 518 to block 514 where the method continues. If a person has not been contacted in block 546, the method follows line 548 to block 550 where a follow-up is scheduled by the service provider.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

We claim:

1. A system for providing profile information to a service provider, the profile information being information pertaining to a user of a mobile device, who is an occupant of a vehicle, and who has the mobile device, in the vehicle, the system comprising:
    a telematics controller coupled to the database and having a first transceiver configured to wirelessly detect the presence of and to wirelessly communicate with a mobile device in the vehicle, the telematics controller being configured to receive from a detected mobile device, an identification of the mobile device, and to receive from the detected mobile device, profile information of a user of the detected mobile device, the telematics controller being additionally configured to store the profile information of the user, and configured to receive and store a prioritized contact list;
    a network access device coupled to the database and having a second transceiver configured to wirelessly communicate with the service provider, wherein the network access device is configured to transmit the profile information of the user of the detected mobile device if a crash condition is identified and the detected mobile device was in communication with the telematics controller during a time period just prior to the crash condition, the network access device being additionally configured to transmit the prioritized contact list, if a crash condition is identified.

2. The system according to claim 1, wherein the mobile device is a mobile phone and a crash condition initiates a phone call between at least one of: the network access device and the telematics controller, and the mobile phone.

3. The system according to claim 1, further comprising a user interface connected to the telematics controller, the user interface being configured to allow entry of profile information.

4. The system according to claim 3, wherein the user interface is configured to prompt a user to enter user profile information upon detecting an unknown mobile device.

5. The system according to claim 3, wherein user profile information comprises said prioritized contact list.

6. The system according to claim 1, wherein profile information comprises seating information.

7. The system according to claim 6, wherein the telematics controller is configured to determine seating information periodically and configured to store determined seating information in a non-transitory memory device.

8. The system according to claim 1, further comprising a plurality of transceivers coupled to the telematics controller and which are located at different locations in the vehicle.

9. The system according to claim 8, wherein at least one transceiver of the plurality of transceivers is located in the back seat area of the vehicle and configured to determine if an occupant is in the back seat area of the vehicle based on signal strength from a corresponding mobile device of the at least one mobile device.

10. The system according to claim 8, wherein at least one transceiver of the plurality of receivers is located in the right side of the vehicle and configured to determine if an occupant is seated on the right side of the vehicle based on signal strength from a corresponding mobile device of the at least one mobile device.

11. The system according to claim 1, wherein the service provider is configured to automatically place a call to one of the at least one mobile devices detected in the vehicle after the crash condition is detected.

12. A system for providing profile information, for occupants of a vehicle, the system comprising:
   a mobile phone having an identification and having profile information for a user of the mobile phone, the mobile phone being configured to be able to wirelessly communicate using Bluetooth;
   a telematics controller coupled to the database and having a first Bluetooth transceiver configured to wirelessly detect the presence of a mobile phone in the vehicle and to wirelessly receive the identification from the mobile phone, receive the profile information from the mobile phone and configured to store the identification and the received profile information, the telematics controller being additionally configured to receive and store a prioritized list of contacts to call in an emergency;
   a network access device coupled to the database and having a second transceiver, which is configured to wirelessly communicate with a service provider using a cellular network protocol;
   the network access device being configured to communicate with a service provider through the second transceiver, wherein the network access device is configured to transmit the profile information of the user of the mobile phone to a service provider if a crash condition is identified and the mobile phone was in communication with the telematics controller during a time period just prior to the crash condition, and configured to transmit the prioritized list of contacts if a crash condition is identified.

13. The system according to claim 12, further comprising a user interface connected to the telematics controller, wherein the user interface is configured to prompt a user to enter user profile information comprising age, gender, and health information upon detecting an unknown mobile device.

14. The system according to claim 12, wherein the profile information includes seating information, and wherein the telematics controller is configured to determine the seating information periodically using a plurality of transceivers located at different locations in the vehicle, the determined seating information being stored by the telematics controller in a non-transitory memory device.

15. The system according to claim 14, wherein at least one first transceiver of the plurality of transceivers is located in the back seat area of the vehicle and wherein the telematics controller is configured to determine if a user of a mobile phone is in the back seat area of the vehicle based on signal strength from the mobile phone and wherein at least one second transceiver of the plurality of receivers is located in the right side of the vehicle, and wherein the telematics controller is additionally configured to determine if a user of a mobile phone is seated on the right side of the vehicle based on signal strength from the mobile phone.

16. A method for providing profile information, for occupants of a vehicle, the method comprising:
   detecting a mobile device and after the mobile device is detected, communicating with the mobile device to receive an identification from the mobile device and to receive profile information about a user of the mobile device and receive a prioritized list of contacts to be called in an emergency;
   storing user profile information and storing the prioritized list of contacts;
   transmitting the user profile information and the prioritized list of contacts if a crash condition is identified and if communication with the mobile device occurred during a time period just prior to the crash condition.

17. The method according to claim 16, further comprising: prompting a user to enter user profile information comprising at least one of: age, gender, and health information upon detecting an unknown mobile device.

18. The method according to claim 16, wherein the profile information includes seating information, the seating information being determined periodically using a plurality of transceivers located at different locations in the vehicle.

19. The method according to claim 18, wherein at least one first transceiver of the plurality of transceivers is located in the back seat area of the vehicle to determine if an occupant is in the back seat area of the vehicle based on signal strength from the mobile phone and at least one second transceiver of the plurality of receivers is located in the right side of the vehicle to determine if an occupant is seated on the right side of the vehicle based on signal strength from the mobile phone.

20. A non-transitory computer readable storage medium having stored therein instructions executable by a programmed processor for providing profile information for occupants of a vehicle, the storage medium comprising instructions for:
   detecting and wirelessly communicating with a mobile device;
   receiving an identification from the mobile device and receiving from the mobile device, profile information for a user of the mobile device and receiving a prioritized list of contacts that are to be called in an emergency;
   storing profile information for a user of the mobile device in a database and storing the prioritized list of contacts;
   communicating with a service provider;
   transmitting the profile information for a user of the mobile device and transmitting the prioritized list of contacts, if a crash condition is identified and if the mobile device was in communication with a telematics controller during a time period just prior to the crash condition.

21. The computer readable storage medium according to claim 20, further comprising instructions for prompting a user to enter user profile information comprising at least one of: age, gender, and health information upon detecting an unknown mobile device.

22. The computer readable storage medium according to claim 20, wherein the profile information includes seating information, the seating information being determined periodically using a plurality of transceivers located at different locations in the vehicle.

23. The computer readable storage medium according to claim 22, wherein at least one first transceiver of the plurality of transceivers is located in the back seat area of the vehicle to determine if an occupant is in the back seat area of the vehicle based on signal strength from the mobile phone and at least one second transceiver of the plurality of receivers is located in the right side of the vehicle to determine if an occupant is seated on the right side of the vehicle based on signal strength from the mobile phone.

* * * * *